US010803637B2

(12) United States Patent
Fainshtein et al.

(10) Patent No.: US 10,803,637 B2
(45) Date of Patent: Oct. 13, 2020

(54) DYNAMIC INTERACTIVE DISPLAY OF MULTI-PARAMETER QUANTITATIVE BIOLOGICAL DATA

(71) Applicant: Becton, Dickinson and Company, Franklin Lakes, NJ (US)

(72) Inventors: Alexander Fainshtein, San Jose, CA (US); Oliver Crespo-Diaz, San Jose, CA (US); Mengxiang Tang, San Jose, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 58 days.

(21) Appl. No.: 16/025,683

(22) Filed: Jul. 2, 2018

(65) Prior Publication Data

US 2019/0026928 A1    Jan. 24, 2019

Related U.S. Application Data

(60) Provisional application No. 62/608,200, filed on Dec. 20, 2017, provisional application No. 62/534,003, filed on Jul. 18, 2017.

(51) Int. Cl.
*G06T 11/20* (2006.01)
*G01N 15/14* (2006.01)
(Continued)

(52) U.S. Cl.
CPC ........... *G06T 11/206* (2013.01); *G01N 15/02* (2013.01); *G01N 15/1456* (2013.01);
(Continued)

(58) Field of Classification Search
CPC ......... G06T 11/206; G06T 19/20; G06T 3/60; G06T 2200/24; G06T 2219/2016;
(Continued)

(56) References Cited

U.S. PATENT DOCUMENTS

| 4,845,653 A | 7/1989 | Conrad et al. |
| 5,627,040 A | 5/1997 | Bierre et al. |

(Continued)

FOREIGN PATENT DOCUMENTS

| FR | 2 935 802 | 3/2010 |
| WO | WO 2006/015056 | 2/2006 |

(Continued)

OTHER PUBLICATIONS

Maximo, Andre, et. al., "M-Cube: A Visualization Tool for Multi-dimensional Multimedia Databases", Apr. 4-9, 2009, ACM, CHI 2009 Boston Massachusetts (Year: 2009).*

(Continued)

*Primary Examiner* — William A Beutel
(74) *Attorney, Agent, or Firm* — Bret E. Field; Bozicevic, Field & Francis LLP

(57) ABSTRACT

Data visualization features are described that provide synchronized displaying of interactive visualizations for high parameter data. The visualization features include graphically representing multiple parameters simultaneously with the associated statistical data for each parameter in an interactive way that maintains the contextual relationships between parameters and the related cell population. The visualization features may be used for displaying high parameter multi-color flow cytometry or genomic data sets.

17 Claims, 7 Drawing Sheets

(51) Int. Cl.
  *G06T 19/20* (2011.01)
  *G01N 15/02* (2006.01)
  *G06F 3/0481* (2013.01)
  *G06T 3/60* (2006.01)
  *G01N 15/10* (2006.01)
  *G06F 3/0484* (2013.01)

(52) U.S. Cl.
  CPC ..... *G01N 15/1459* (2013.01); *G06F 3/04815* (2013.01); *G06T 3/60* (2013.01); *G06T 19/20* (2013.01); *G01N 2015/1006* (2013.01); *G06F 3/04842* (2013.01); *G06F 3/04845* (2013.01); *G06F 3/04847* (2013.01); *G06T 2200/24* (2013.01); *G06T 2219/2016* (2013.01)

(58) Field of Classification Search
  CPC ........... G01N 15/1456; G01N 15/1459; G01N 15/02; G01N 2015/1006; G06F 3/04815; G06F 3/04847; G06F 3/04845; G06F 3/04842
  See application file for complete search history.

(56) References Cited

U.S. PATENT DOCUMENTS

| | | | |
|---|---|---|---|
| 5,739,000 | A | 4/1998 | Bierre et al. |
| 5,795,727 | A | 8/1998 | Bierre et al. |
| 5,962,238 | A | 10/1999 | Sizto et al. |
| 6,014,904 | A | 1/2000 | Lock |
| 6,944,338 | B2 | 9/2005 | Lock et al. |
| 8,990,047 | B2 | 3/2015 | Zhu et al. |
| 9,007,398 | B1 * | 4/2015 | Sinram ............... G06T 11/203 345/629 |
| 9,567,645 | B2 | 2/2017 | Fan et al. |
| 2012/0245889 | A1 | 9/2012 | Zhu et al. |
| 2013/0097563 | A1 * | 4/2013 | Pacheco Rodrigues Velho .......... G06F 3/04815 715/850 |
| 2013/0345975 | A1 * | 12/2013 | Vulcano ............ G01C 21/3632 701/533 |
| 2014/0071119 | A1 * | 3/2014 | Piemonte ............ G06T 19/003 345/419 |
| 2014/0078102 | A1 * | 3/2014 | Araki ................. G06F 3/016 345/174 |
| 2014/0240314 | A1 * | 8/2014 | Fukazawa ........... G06T 11/206 345/419 |
| 2016/0306431 | A1 * | 10/2016 | Stafford ............... G06F 3/0485 |
| 2017/0268981 | A1 | 9/2017 | Diebold et al. |
| 2017/0372012 | A1 * | 12/2017 | Motoki ............... G06F 17/245 |

FOREIGN PATENT DOCUMENTS

| | | |
|---|---|---|
| WO | WO 2013/054502 | 4/2013 |
| WO | WO 2016/094720 | 6/2016 |

OTHER PUBLICATIONS

International Search Report for International Application No. PCT/US2018/040626 dated Sep. 13, 2018.

International Search Report for International Application No. PCT/US2018/040621 dated Sep. 13, 2018.

Brunhart-Lupo et al. "Simulation exploration through immersive parallel planes." 2016 Workshop on Immersive Analytics (IA), IEEE, Mar. 20, 2016. pp. 19-24.

Falkman, Goran. "Information visualization in clinical Odontology: multidimensional analysis and interactive data exploration." Artificial Intelligence in Medicine. 22(2):133-158. May 1, 2001.

Johansson et al. "On the usability of three-dimensional display in parallel coordinates: Evaluating the efficiency of identifying two-dimensional relationships." Information Visualization. Jan. 1, 2014. pp. 29-41. London, England. Retrieved from the Internet: http://webstaff.itn.liu.se/~jimjo94/papers/Eval_3DPC__IVJournal.pdf.

Maksakov, Evgeny. "FlowCytoVis: Visualization Tool for Flow Cytometry Data Standards Project." Dec. 15, 2006. http://www.cs.ubc.ca/~tmm/courses/old533/projects.htm. Retrieved from the internet: http://www.cs.ubc.ca/~tmm/courses/old533/projects/evgeny/report.pdf. Retrieved on Sep. 4, 2018.

Rubel et al. "PointCloudXplore: Visual Analysis of 3D Gene Expression Data Using Physical Views and Parallel Coordinates." Eurovis-Eurographics / IEEE VGTC Symposium on Visualization, Jan. 1, 2006.

Streit et al. "3D parallel coordinate systems—A new data visualization method in the context of microscopy-based multicolor tissue cytometry." NIH Public Access Author Manuscript, vol. 69A, No. 7, May 5, 2006. pp. 601-611.

Bauer et al. (eds.), Clinical Flow Cytometry: Principles and Applications, Williams & Wilkins (1993).

Jaroszeski et al. (eds.), Flow Cytometry Protocols, Methods in Molecular Biology No. 91, Humana Press (1997).

Landy et al. (eds.), Clinical Flow Cytometry, Annals of the New York Academy of Sciences vol. 677 (1993).

Ormerod (ed.), Flow Cytometry: A Practical Approach, Oxford Univ. Press (1994).

Pawley (ed.), Handbook of Biological Confocal Microscopy, 2nd Edition, Plenum Press (1989).

Practical Shapiro, Flow Cytometry, 4th ed., Wiley-Liss (2003).

* cited by examiner

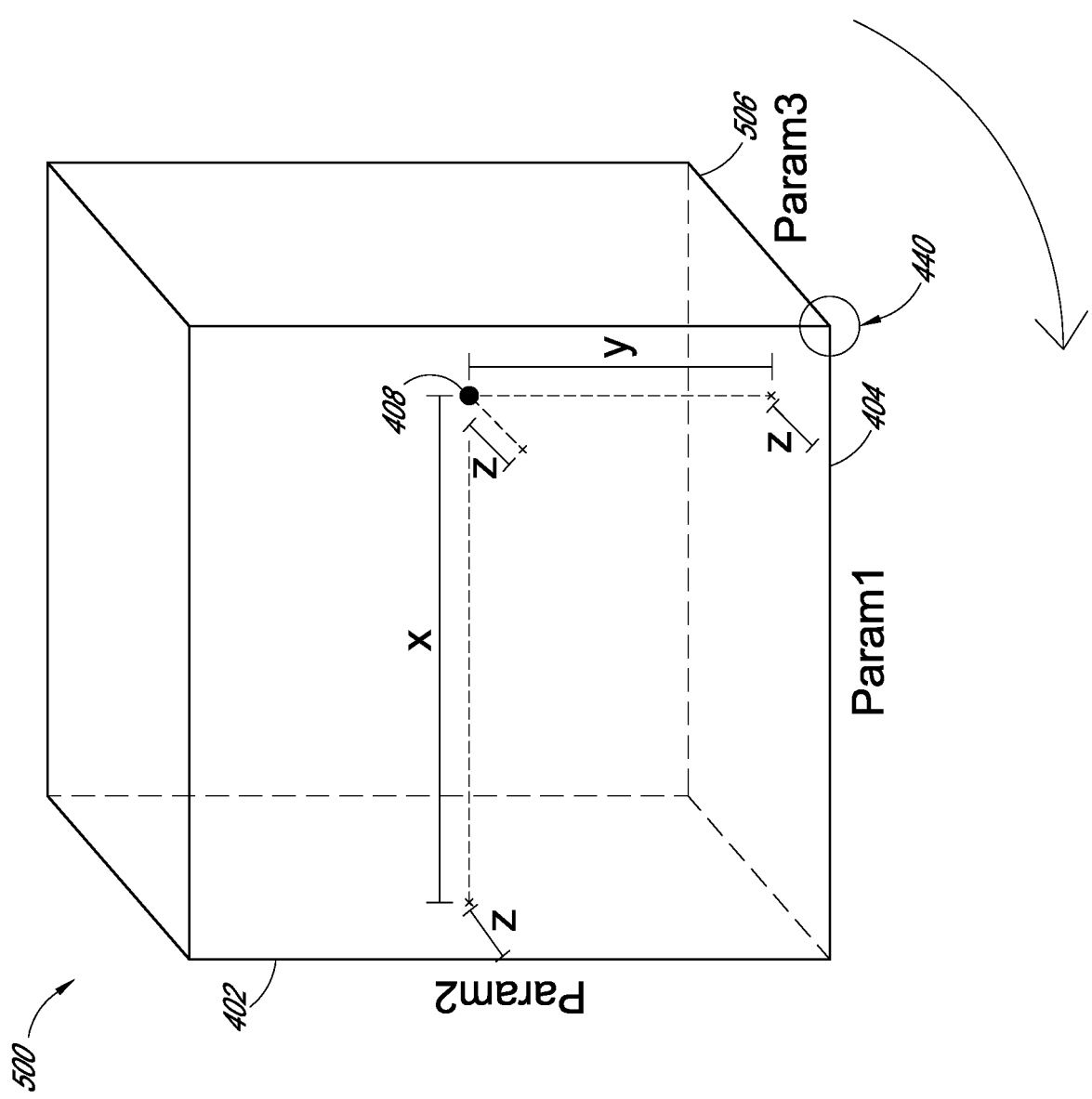

DYNAMIC INTERACTIVE DISPLAY OF MULTI-PARAMETER QUANTITATIVE BIOLOGICAL DATA

CROSS-REFERENCE TO RELATED APPLICATION(S)

This application claims priority to U.S. Provisional Application No. 62/534,003, filed on Jul. 18, 2017, which is incorporated by reference in its entirety. This application also claims priority to U.S. Provisional Application No. 62/608,200, filed on Dec. 20, 2017, which is incorporated by reference in its entirety. Any and all priority claims identified in the Application Data Sheet, or any correction thereto, are also hereby incorporated by reference under 37 C.F.R. § 1.57.

BACKGROUND

Technical Field

This disclosure relates to interactive graphic displays, and in particular to improved dynamic interactive displays of multi-parametric measurements, such as measurements for cells from a sample analyzed by a biological particle analyzer such as a flow cytometer.

Background

Particle analyzers, such as flow and scanning cytometers, are analytical tools that enable the characterization of particles on the basis of optical parameters such as light scatter and fluorescence. In a flow cytometer, for example, particles, such as molecules, analyte-bound beads, or individual cells, in a fluid suspension are passed by a detection region in which the particles are exposed to an excitation light, typically from one or more lasers, and the light scattering and fluorescence properties of the particles are measured. Particles or components thereof typically are labeled with fluorescent dyes to facilitate detection. A multiplicity of different particles or components may be simultaneously detected by using spectrally distinct fluorescent dyes to label the different particles or components. In some implementations, a multiplicity of photodetectors, one for each of the scatter parameters to be measured, and one for each of the distinct dyes to be detected are included in the analyzer. The data obtained comprise the signals measured for each of the light scatter parameters and the fluorescence emissions.

Cytometers may further comprise means for recording the measured data and analyzing the data. For example, data storage and analysis may be carried out using a computer connected to the detection electronics. For example, the data can be stored in tabular form, where each row corresponds to data for one particle, and the columns correspond to each of the measured parameters. The use of standard file formats, such as an "FCS" file format, for storing data from a flow cytometer facilitates analyzing data using separate programs and/or machines. Using current analysis methods, the data typically are displayed in 2-dimensional (2D) plot diagrams for ease of visualization, but other methods may be used to visualize multidimensional data.

The parameters measured using a flow cytometer typically include the excitation light that is scattered by the particle along a mostly forward direction, referred to as forward scatter (FSC), the excitation light that is scattered by the particle in a mostly sideways direction, referred to as side scatter (SSC), and the light emitted from fluorescent molecules in one or more channels (range of frequencies) of the spectrum, referred to as FL1, FL2, etc., or by the fluorescent dye that is primarily detected in that channel. Different cell types can be identified by the scatter parameters and the fluorescence emissions resulting from labeling various cell proteins with dye-labeled antibodies.

Both flow and scanning cytometers are commercially available from, for example, BD Biosciences (San Jose, Calif.). Flow cytometry is described in, for example, Landy et al. (eds.), Clinical Flow Cytometry, Annals of the New York Academy of Sciences Volume 677 (1993); Bauer et al. (eds.), Clinical Flow Cytometry: Principles and Applications, Williams & Wilkins (1993); Ormerod (ed.), Flow Cytometry: A Practical Approach, Oxford Univ. Press (1994); Jaroszeski et al. (eds.), Flow Cytometry Protocols, Methods in Molecular Biology No. 91, Humana Press (1997); and Practical Shapiro, Flow Cytometry, 4th ed., Wiley-Liss (2003); all incorporated herein by reference. Fluorescence imaging microscopy is described in, for example, Pawley (ed.), Handbook of Biological Confocal Microscopy, 2nd Edition, Plenum Press (1989), incorporated herein by reference.

The data obtained from an analysis of cells (or other particles) by multi-color flow cytometry are multidimensional, wherein each cell corresponds to a point in a multi-dimensional space defined by the parameters measured. Populations of cells or particles are identified as clusters of points in the data space. The identification of clusters and, thereby, populations can be carried out manually by drawing a gate around a population displayed in one or more 2-dimensional plot diagrams, referred to as "scatter plots" or "dot plots," of the data. Alternatively, clusters can be identified, and gates that define the limits of the populations, can be determined automatically. Examples of methods for automated gating have been described in, for example, U.S. Pat. Nos. 4,845,653; 5,627,040; 5,739,000; 5,795,727; 5,962,238; 6,014,904; 6,944,338; and 8,990,047, each incorporated herein by reference.

The parameters may include other measurements of a particle. For example, acoustic properties for a particle may be measured and included in the event data. The acoustic property may be directly measured for the particle itself or indirectly measured such as by detecting a change in an acoustic field when the particle interacts with the acoustic field.

For example, in one operational mode, a sample under study can be illuminated concurrently with a plurality of excitation frequencies, each of which can be obtained, e.g., by shifting the central frequency of a laser beam. More specifically, a plurality of sample locations can be concurrently illuminated by a laser beam that is generated by mixing a reference laser beam (herein also referred to as a local oscillator beam) with a plurality of radiofrequency-shifted laser beams such that each sample location is illuminated by the reference beam and one of the radiofrequency-shifted beams to excite a fluorophore of interest at that location, if present. In some embodiments, the reference beam can itself be generated via radiofrequency shifting of a laser beam. Thus, each spatial location of the sample can be "tagged" with a different beat frequency corresponding to a difference between the frequency of the reference beam and that of one of the radiofrequency-shifted beams. In other words, the fluorescence radiation emitted by the fluorophore will spatially encode the beat frequencies. The fluorescence emission can be detected and its frequency components can be analyzed to construct a fluorescence image of the sample.

As another example, a sample can be illuminated successively over a time interval by a laser beam at a plurality of excitation frequencies. In some such embodiments, the excitation frequencies can be obtained by applying a time-varying drive signal to an acousto-optic deflector (AOD), which receives a laser beam. In many embodiments, the laser beam has a frequency in the hundreds of terahertz (THz) range, e.g., in a range of about 300 THz to about 1000 THz. The drive signal applied to the AOD is typically in the radiofrequency range, e.g., in a range of about 10 MHz to about 250 MHz. The passage of the laser beam through the AOD generates a plurality of diffracted beams, each corresponding to a different diffraction order. While the zeroth diffracted beam exhibits no frequency shift relative to the frequency of the input laser beam, the higher-order diffracted beams exhibit a frequency shift relative to the frequency of the input laser beam corresponding to the frequency of the drive signal or a multiple thereof. In some embodiments, the first order diffracted beam having a frequency corresponding to the frequency of the input laser beam shifted by the drive signal is employed as the excitation beam for exciting a fluorophore of interest, if present in a sample under analysis. As the drive signal varies over time, the frequency and angular shift of the first-order diffracted beam also varies, thereby allowing the illumination of the sample at different excitation frequencies at different locations. The fluorescence emission, if any, from each illuminated location can be collected and analyzed to construct a fluorescence image of the sample. Additional features and systems for parameter detection including acoustic properties are described in U.S. Patent Publication No. 20170268981, which is hereby incorporated by reference.

As number of parameters that can be simultaneously measured by flow cytometers or other particle analyzers for a cell or sample increases due to factors such as new fluorochromes or detectors, the event data increases in size and complexity.

SUMMARY

The systems, methods, and devices of the disclosure each have several innovative aspects, no single one of which is solely responsible for the desirable attributes disclosed herein.

In a further innovative aspect, a graphics control system for displaying a representation of multi-parametric data for cells on a graphical user interface is provided. The system includes plot generating circuitry configured to dynamically display, via a display device, a plot diagram in two-dimensions. The plot diagram includes: a vertical axis corresponding to a first parameter; a horizontal axis corresponding to a second parameter of the set of parameters; a graphical indicia for a cell at an intersection point for a first measurement for the first parameter for the cell and a second measurement for the second parameter for the cell; and an interactive control configured to transmit rotation information based on an interaction therewith, wherein the rotation information identifies a rotation axis and a rotation quantity. The system includes an input device port configured to: receive, from the display device, a selection of a third parameter included in the set of parameters, and receive, from the interactive control, the rotation information. In response to receiving the rotation information, the plot generating circuitry is further configured to dynamically display a third axis on the plot diagram based at least in part on the rotation information, wherein the third axis corresponds to the third parameter rendered in a third dimension.

The plot generating circuitry is further configured to move the graphical indicia for the cell to a three-dimensional intersection point comprising: (i) the first measurement for the first parameter for the cell, (ii) the second measurement for the second parameter for the cell, and (iii) a third measurement for the third parameter for the cell.

The input device port may be further configured to receive additional rotation information from the interactive control, wherein the rotation quantity meets or exceeds a rotation threshold. The plot generating circuitry may terminate the display of the first axis on the plot diagram, wherein, upon said terminating, the plot diagram includes two-dimensions corresponding to the second parameter and the third parameter.

The graphics control system may include a memory storing the third parameter in association with an identifier for the user. The input device port may be configured to receive, from the display device, the identifier for the user. The plot generating circuitry may be further configured to retrieve, from the memory, the third parameter based at least in part on the identifier.

In some implementations of the graphics control system, the interactive control may include a first region bounding the vertical axis. The input device port may be configured to receive selection information identifying selection of a first point in the first region and to receive deselection information identifying a second point where the selection was terminated. The plot generating circuitry may be further configured to generate the rotation quantity based on a distance between the first point and the second point and to generate a rotation angle based on an angle between the first point and the second point.

The cell may be taken from a sample. The graphics control system may include a particle analyzer input port configured to receive measurements, from a particle analyzer (e.g., a flow cytometer or single-cell analysis system), for a second cell from the sample. The plot generating circuitry may be configured to dynamically display the plot diagram in two-dimensions by including a second graphical indicia for the second cell at a second intersection point for a third measurement for the first parameter for the second cell and a fourth measurement for the second parameter for the second cell.

In a further innovative aspect, a system for displaying a representation of multi-parametric data for cells on a graphical user interface is provided. The system includes a particle analyzer configured to detect, for each of the cells, measurements for respective markers. The system further includes graphics processing circuitry in communication with the particle analyzer. The graphics processing circuitry is configured to dynamically display, via a display device, a plot diagram in two-dimensions. The plot diagram includes: a vertical axis corresponding to a first marker included in the markers; a horizontal axis corresponding to a second marker included in the markers; a graphical indicia for a cell at an intersection point for a first measurement for the first marker for the cell and a second measurement for the second marker for the cell; and an interactive control configured to transmit rotation information based on an interaction therewith, wherein the rotation information identifies a rotation angle and a rotation quantity. The graphics processing circuitry is also configured to receive, from the display device, a selection of a third marker included in the markers and receive, from the interactive control, the rotation information. In response to receiving the rotation information, the graphics control circuitry dynamically displays a third axis on the plot diagram based at least in part on the rotation information, wherein the third axis corresponds to the third marker rendered in a third dimension. The graphics control circuitry also moves the graphical indicia for the cell to a three-dimensional intersection point including: (i) the first measurement for the first marker for the cell, (ii) the second measurement for the second marker for the cell, and (iii) a third measurement for the third marker for the cell.

BRIEF DESCRIPTION OF DRAWINGS

FIG. 5A shows an example of an interactive cube plot diagram displayed after an interaction with the interactive two-dimensional plot diagram shown in FIG. 4.

DETAILED DESCRIPTION

Figure 1:
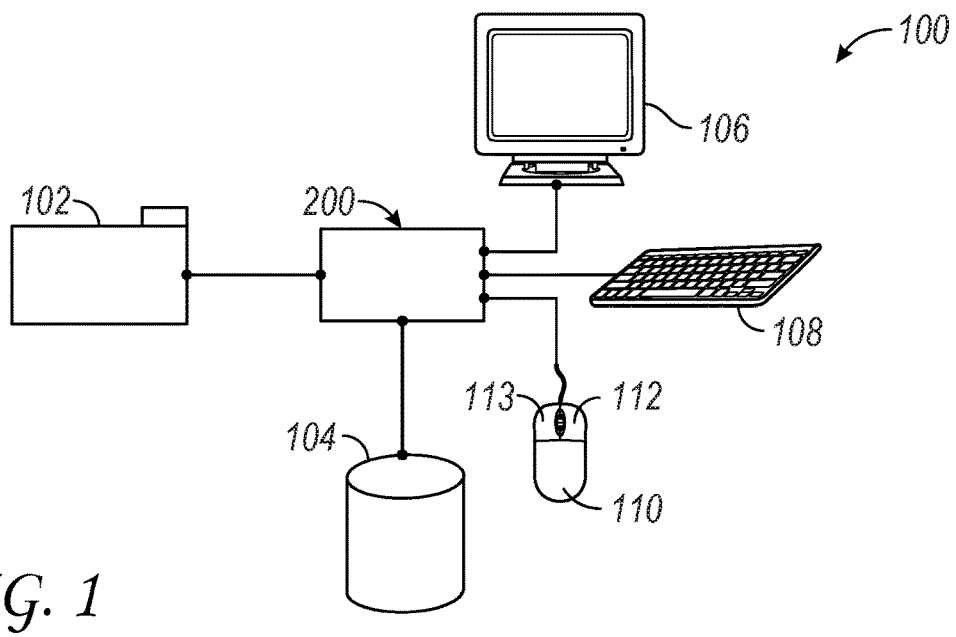
FIG. 1 shows a functional block diagram for one example of a graphics control system for analyzing and displaying cytometric events.

Previous solutions to multi-parametric data analysis for flow cytometry data typically involve the generating and displaying a large number of bivariate plot diagrams side by side or the generating and displaying scatterplot matrices. However, as the number of parameters measured increases, so does the combinations of scatterplot diagrams in the matrix, making the presentation and ultimate analysis of such data increasingly complex. For example, managing the layout of a graphical user interface includes allocating a limited display area for many combinations of the bivariate plot diagrams. The assessment of which combinations to show and where to show the selected combinations introduce complexity to the overall display system.

Parallel coordinate plot diagrams (PCPs) may be included to display or summarize items that have long list of components or attributes associated with them. The list of components or attributes may be referred to as dimensions. How the dimensions are represented can be important to a user for assessing biological meaning to the measurements. However, parallel coordinate plot diagrams only provide a narrow view of the data and can be difficult to represent complex relationships between events or parameters.

In a 2D plot diagram, each data point may correspond to a small area in the plot diagram. A data point can be presented as a small dot or other symbol displayed in this area, or just as a coloring of this area, or in other way. The graphical indicia used at the location of this small area may be defined by the values of the parameters of the data point (e.g., measurements for a cell or particle). In a PCP, each data point is usually represented by a line, stretching across the whole plot diagram. Intersections with a set of axes corresponding to specific parameters indicate the measured value for the parameter for a cell.

To address these problems with displaying multi-parameter flow cytometry data, new data visualization features are described that provide a fast and accurate tool for displaying visualizations of high parameter data. The graphics display techniques described require a specific structured graphical user interface paired with a prescribed functionality directly related to the graphical user interface's structure that is addressed to and resolves specific problems in the current visualization arts. The visualization features include graphically representing multiple parameters simultaneously in an interactive way that maintains the contextual relationships between parameters and the related cell population. The visualization features could be used for displaying high parameter multi-color flow cytometry and genomic data sets.

In another aspect, a 2D plot diagram can be presented with interactive regions that allow selective display of a third dimension. When creating a 2D plot diagram, two parameters are typically selected for the two axes (e.g., Axis 1 and Axis 2, horizontal and vertical). The numeric values of these parameters, for different data points (e.g., cell or particles), define where the symbols or other graphical indicia representing these data points are placed in the plot diagram. A single 2D plot does not show more than two dimensions, leaving other dimensional information hidden. One way to present the other dimensions is allocate additional display area for other 2D plot diagrams and generate multiple 2D plot diagrams side by side to display more complete information. Alternatively, an application can re-use an allocated area, but allow the user to change the parameters associated with the plot diagram axes. This way the user will observe different parts of the whole information sequentially in time but never with more than two dimensions at a given point in time.

When changing axes, it may be difficult for the user to comprehend relations between multiple parameters. This may also present difficulties in maintaining a consistent rendering of the various diagrams. Different markers may be used for different data points in the various diagrams. To correlate events, respective diagrams must be displayed to provide an interface for comparing location of these markers across different plot diagrams. As these different diagrams are displayed in respective portions of the interface, such comparisons between the diagrams may be difficult to identify.

Recent technology allows the animation of the transition between parameters, by gradually moving the markers from initial positions in a first diagram to final positions in a second diagram. But it can be resource intensive to generate each of the various permutations of 2D plot diagrams for multi-parameter quantitative biological data because of the size of the data set typically represented by the diagrams and the limited area available on the interface for rendering the diagrams. It also precludes a single plot diagram from presenting more than two dimensions. The features described provide rich 3D information through an interactive 2D plot diagram. A 2D plot diagram may be interacted with to transition to a 3D view. The interactions may indicate the pace and the details of the transition. Furthermore, interactions with the axis of rotation, rotation angle, and the projection direction allow dynamic 3D presentations of the event data. Such features provide a specific manner of displaying a limited set of information to the user, rather than using conventional user interface methods to display a generic interfaces showing partial, incomplete, or out of context information. By meaningfully focusing how and when to display event data, an improved graphics system and interface are provided for electronic devices such as those with small screens or limited display resources.

As used herein, "system," "instrument," "apparatus," and "device" generally encompass both the hardware (e.g., mechanical and electronic) and, in some implementations, associated software (e.g., specialized computer programs for graphics control) components.

As used herein, an "event" generally refers to the data measured from or about a single particle, such as a cell or synthetic particle. Typically, the data measured from a single particle include a number of parameters, including one or more light scattering parameters, and at least one fluorescence intensity parameters. Thus, each event is represented as a vector of parameter measurements, wherein each measured parameter corresponds to one dimension of the data space. The dimensions may relate to an intensity, an acoustic property, or other measurement for the cell or synthetic particle detected by a particle analyzer. In some biological applications, event data may correspond to quantitative biological data indicating expression of a particular protein or gene.

As used herein, a "population," or "subpopulation" of particles, such as cells or other particles, generally refers to a group of particles that possess optical properties with respect to one or more measured parameters such that measured parameter data form a cluster in the data space. Thus, populations are recognized as clusters in the data. Conversely, each data cluster generally is interpreted as corresponding to a population of a particular type of cell or particle, although clusters that correspond to noise or background typically also are observed. A cluster may be defined in a subset of the dimensions, e.g., with respect to a subset of the measured parameters, which corresponds to populations that differ in only a subset of the measured parameters.

As used herein, a "gate" generally refers to a boundary identifying a subset of data of interest. In cytometry, a gate may bound a group of events of particular interest. As used herein, "gating" generally refers to the process of defining a gate for a given set of data.

FIG. 1 shows a functional block diagram for one example of a graphics control system for dynamically displaying flow cytometry data. The system 100 may include a graphics control system 100 configured to implement processes for generating one or more of the graphical user interfaces describe herein. Dynamically displaying may include causing display of particle data (or a representation thereof) directly or indirectly via a display device.

A flow cytometer 102 may be configured to acquire flow cytometric events. For example, flow cytometer 102 may generate flow cytometric event data. The flow cytometer 102 may be configured to provide flow cytometric events to a graphics controller 200. The graphics controller 200 may be implemented as specially configured graphics processing circuitry to generate, transmit, or receive information for the interfaces described. A data communication channel may be included between the flow cytometer 102 and the graphics controller 200. The flow cytometric events may be provided to the graphics controller 200 via the data communication channel.

Aspects of the description may specifically reference flow cytometers and flow cytometry event data. In some embodiments, other particle analyzers may generate the event data corresponding to other quantitative biological data such as data indicating expression of a particular protein or gene. For example, the event data may indicate the presence of an mRNA sequence within a cell or across a mixed population of cells. The event data may identify an absolute number of gene transcripts of a transcriptome for a cell or cells. Presentation of the event data may be adjusted per cell or per gene expression to provide different perspectives on populations of event data of particular interest (e.g., associated with a particular mRNA sequence, taken from a specific cell, etc.). The event data may be generated using massively parallel single cell analytic features such as those described in U.S. Pat. No. 9,567,645 which is hereby incorporated by reference in its entirety. One commercially available single-cell analysis system is the Becton, Dickinson Rhapsody™ hardware by Becton, Dickinson and Company of Franklin Lakes, N.J. The features discussed may be applied to visualize other or additional quantitative multi-parameter biological data such as that associated with gene expression.

The flow cytometric data may be received in real-time as measurements are collected by the flow cytometer 102. In some implementations, the flow cytometric data may be received via a bulk transfer operation between the flow cytometer 102 and the graphics controller 200. The flow cytometric data received from the flow cytometer 102 may include flow cytometric event data (e.g., measurements of detected fluorescence for one or more markers for each cell included in a sample). The graphics controller 200 may be configured to dynamically generate and display an interface showing flow cytometric events for display via a display device 106. The display device 106 may be implemented as a monitor, a tablet computer, a smartphone, or other electronic device configured to present graphical interfaces.

The graphics controller 200 may be configured to receive a gate selection signal identifying the gate from a first input device. For example, the first input device may be implemented as a mouse 110. The mouse 110 may initiate a gate selection signal to the graphics controller 200 identifying the gate to be displayed on or manipulated via the display device 106 (e.g., by clicking on or in the desired gate when the cursor is positioned there). The gate may also be used to identify the population for displaying additional or alternative interfaces.

The graphics controller 200 may be configured to detect interactions with an interface. The second input device may be implemented as a keyboard 108. The keyboard 108 may control changes in plot diagram visualization by sending a signal identifying a triggering event to the graphics controller 200. For example, activation of a specific key or group of keys on the keyboard 108 may generate a specific interaction. In response to the interaction, the graphics controller 200 may be configured to replace or update the interface(s) displayed on the display device 106.

In displaying an interface, the graphics controller 200 may specify interactions for specific regions. For example, an interactive object rendered on the display device 106 may respond to a mouse scroll interaction when the cursor is within the first display region. The response may include changing the selected population to a different gated population and rendering a new version of an interface based on the cytometric data for the different gated population. As another example, an interactive region corresponding to a measurement may be associated with a selection interaction. When the interactive region is selected, additional information about the measurements or marker associated therewith may be displayed such as metrics for the measurements for cells, error rate, marker spectral range, or information regarding the cytometric experiment such as entrainment, average flow rate, initial sample size, total cells measured from the sample, sorting information, or the like. Selection of the interactive region may activate the displayed object for movement such as rotation, dragging, dropping, or other change in display position.

An input device may be implemented as one or more of the mouse 110, the keyboard 108, or other means for providing an input signal to the graphics controller 200 such as a touchscreen, a stylus, an optical detector, or a voice recognition system. Some input devices may include multiple inputting functions. In such implementations, the inputting functions may each be considered an input device. For example, as shown in FIG. 1, the mouse 110 includes a right mouse button 112 and a left mouse button 113, each of which may generate unique interactions with the display.

An interaction may cause the graphics controller 200 to alter the manner in which the data is displayed or which portions of the data is actually displayed on the display device 106 or both at the same time.

The graphics controller 200 may be connected to a storage device 104. The storage device 104 may be configured to receive and store flow cytometric events from the graphics controller 200. The storage device 104 may also be configured to receive and store flow cytometric event data from the graphics controller 200. The storage device 104 may be further configured to allow retrieval of flow cytometric events and flow cytometric event data by the graphics controller 200.

A display device 106 may be configured to receive display data from the graphics controller 200. The display data may comprise plot diagrams of flow cytometric events and gates outlining sections of the plot diagrams. The display device 106 may be further configured to alter the information presented according to input received from the graphics controller 200 in conjunction with input from the flow cytometer 102, the storage device 104, the keyboard 108, or the mouse 110.

Figure 2:
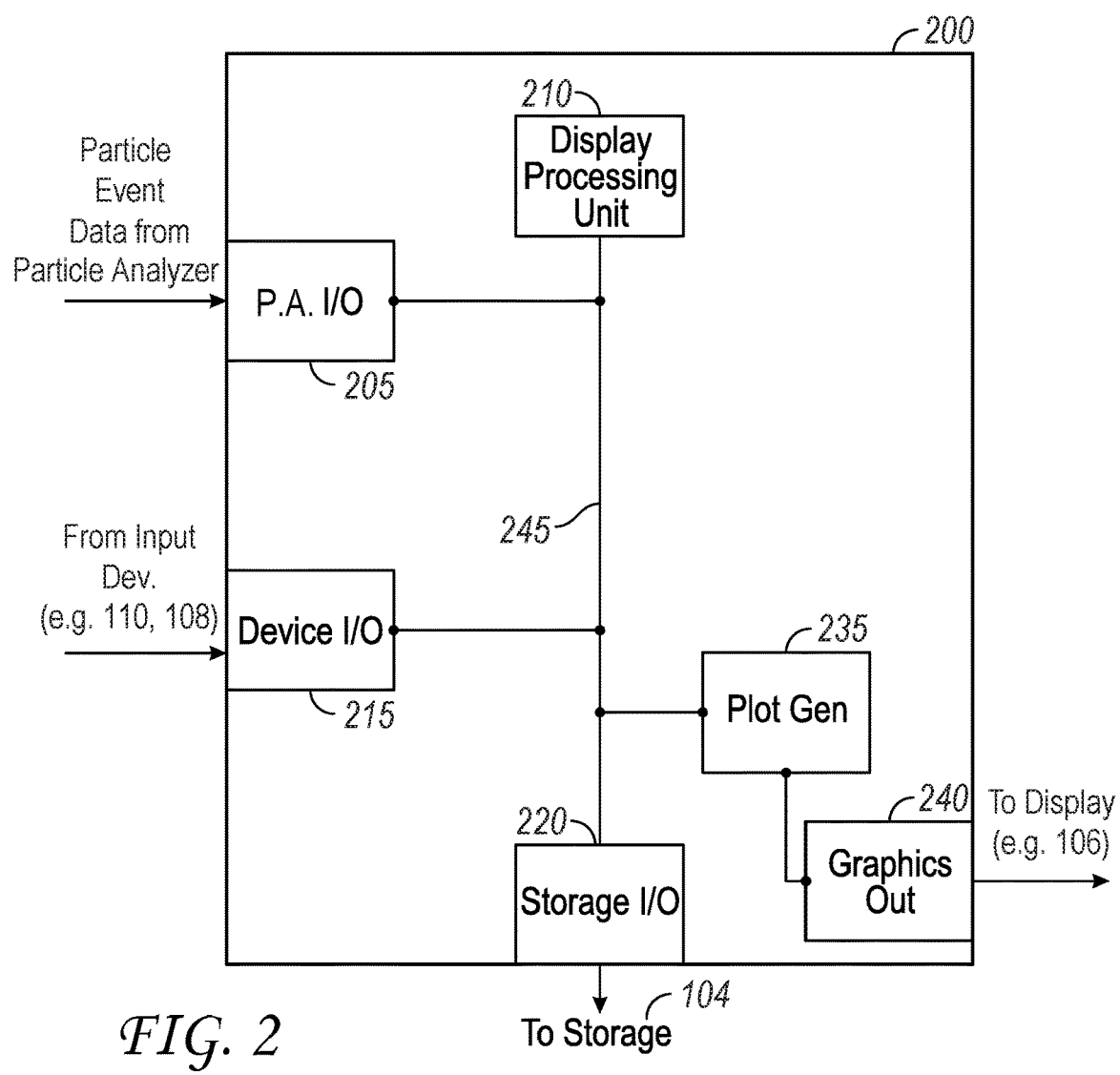
FIG. 2 shows a functional block diagram of an example of a graphics controller.

FIG. 2 shows a functional block diagram of an example of a graphics controller. The graphics controller 200 shown in FIG. 2 may be included in the graphics control system 100 shown in FIG. 1. The graphics controller 200 may be implemented as a specially configured device including circuitry for dynamically displaying flow cytometry data during or after cytometric data processing. In some implementations, the graphics controller 200 may be integrated with a particle analyzer (e.g., the flow cytometer 102), a display device 206 (e.g., tablet computer, laptop computer, desktop computer), or other electronic hardware.

The graphics controller 200 may include a particle analyzer input output interface to exchange information (e.g., events, analyzer control signals, analyzer configuration, etc.) with a particle analyzer. Particle analyzer communication in graphics controller 200 in FIG. 2 may be conducted via a particle analyzer input/output (I/O) interface 205. The particle analyzer input/output interface 205 may be configured to receive cytometric event data from a particle analyzer, such as the flow cytometer 102 shown in FIG. 1. The particle analyzer I/O interface 205 may be a hardware interface providing a path for the event data to be received by the graphics controller 200. For example, the particle analyzer input/output interface 205 may be implemented as a network interface, a Universal Serial Bus interface, a serial data communication interface, memory access device, or other machine-to-machine communication interface. The data may be received in a standardized, machine readable format such as a comma separated list, a token separated list, mark-up language document, or a spreadsheet.

The particle event data received by the graphics controller 200 via the particle analyzer input/output interface 205 may be stored in a storage device such as the storage device 104 shown in FIG. 1. The graphics controller 200 may include a storage input/output (I/O) interface 220 to facilitate storage and retrieval of data to and from a storage device. For example, the storage I/O interface 220 may be implemented as a network interface, a Universal Serial Bus interface, a serial data communication interface, memory access device, or other machine-to-machine communication interface. In some implementations, the storage I/O interface 220 may be configured to generate queries to retrieve information requested by an element of the graphics controller 200. Such queries may be in a standardized query language such as Structured Query Language (SQL). In some implementations, the storage I/O interface 220 may be configured to generate storage commands to persist data in the storage device. SQL update or insert commands are examples of storage commands generated by the storage I/O interface 220.

A display processing unit 210 is shown in FIG. 2. The display processing unit 210 may coordinate the activities of the graphics controller 200. For example, the display processing unit 210 may receive a signal that data has been received via the particle analyzer I/O interface 205. Upon detecting the signal, the display processing unit 210 may transmit an instruction to route the data to the storage I/O interface 220 for storage. The display processing unit 210 may coordinate the activities according to a preconfigured set of machine readable instructions.

The display processing unit 210 may coordinate interaction information received from an input device via a device input/output (I/O) interface 215. The graphics controller 200 shown in FIG. 2 includes the device input/output (I/O) interface 215. The device I/O interface 215 may receive signals or messages from input devices such as a mouse or keyboard. The display processing unit 210 may detect an input signal and adjust a display as will be described in further detail. One input signal may include a message to begin displaying biometric particle data. The input signal may include an identifier for the experiment for which data should be displayed. Using this identifier, the event data may be retrieved such as via the storage I/O interface 220 or from a particle analyzer such as a flow cytometer via the particle analyzer I/O interface 205.

The graphics controller 200 may include a plot generator 235. The plot generator 235 may be configured to generate a computer displayable graphic representation of the event data such an interactive parallel coordinate plot diagram or an interactive cube plot diagram. The plot generator 255 may be triggered by the display processing unit 210 to generate the plot diagram. The triggering event may include receipt of particle event data via the particle analyzer I/O interface 205. In some implementations, the triggering event may include the selection of a group of cells (e.g., a gated population) received via the device I/O interface 215. The triggering event may include an interaction with an interactive control element shown on the display.

The plot generator 235 may then generate a specific interface tailored to the data and the target display device. Graphical indicia used to render the events may be selected by the plot generator 235 based on, for example, the measurement type (e.g., color wavelength), a density of events with similar measurement value(s) (e.g., higher density reflected using higher intensity color), or other property of the particle measurement. The representation may then be provided to a display via a graphics output interface 240. The graphics output interface 240 may be one or more of a video graphics array (VGA) interface, a high definition multimedia interface (HDMI), a wired or wireless network interface, or other communication means configured to provide the described interactive graphic data, directly or indirectly, to a display device.

The elements included in the graphics controller 200 may be coupled by a bus 245. The bus 245 may be a data bus, communication bus, or other bus mechanism to enable the various components of the graphics controller 200 to exchange information. It will further be appreciated that while different elements have been shown, multiple features may be combined into a single element, such as the plot generator 235 and the display processing unit 210. Furthermore, additional elements may be included in the graphics controller 200 to support the features described. For example, a power source is not shown but may be included to provide power for the graphics controller 200. This can allow the graphics controller 200 to operate as a standalone graphics control hub to receive data from one or more particle analyzers, receive inputs from one or more input devices, and display interfaces one or more display devices.

Figure 3:
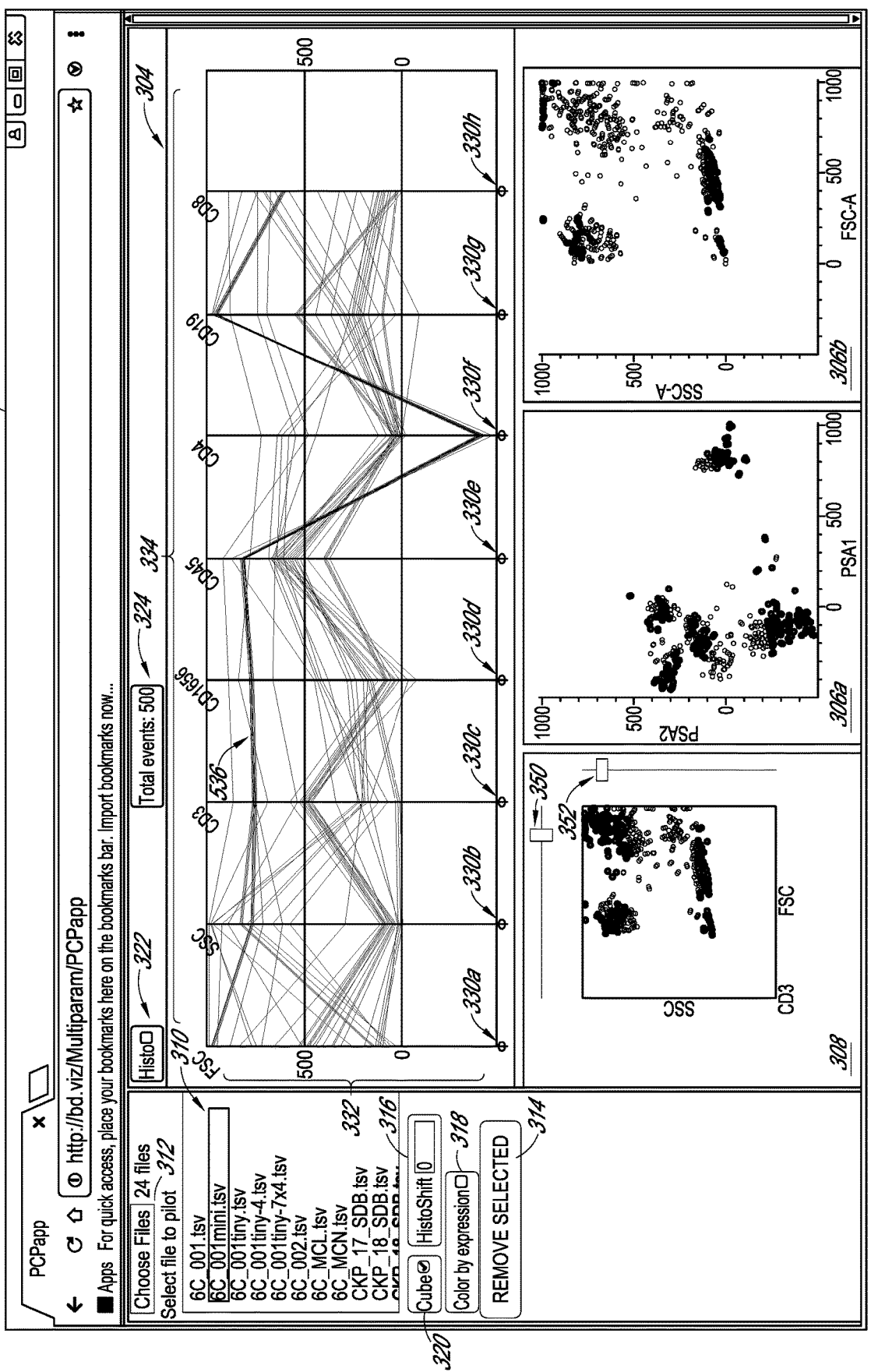
FIG. 3 shows an example interface for interactive display of multi-parameter flow cytometry data.

FIG. 3 shows an example interface for interactive display of multi-parameter flow cytometry data. The interface 300 may be used to provide the diagrams described in a common display such as within a web-browser or other application window 302. The interface 300 may include a choose file control element 312. The choose file control element 312 may be an interactive control element that, when activated, causes the interface to solicit information identifying flow cytometry data for display. The input may identify a file, a flow cytometer, or other source of flow cytometry data. Selected sources may be listed in a list box 310 or other selectable interface element (e.g., drop down, thumbnail library, scrollable display, etc.). A user may interact with the sources listed in the list box 310 to activate or deactivate display of the associated flow cytometry data. For example, in some implementations, the data for a given sample may span multiple files. In such instances, it may be desirable to selectively view portions of the flow cytometry data. In some implementations, it may be desirable to select data for removal from the interface 300. A remove selected element 314 may be included in the interface 300. When the remove selected element 314 is activated, data displayed on a diagram included in the interface 300 may be removed from the interface 300.

The interface 300 may include a color by expression selector 318. Depending on the activation state, the color by expression selector 318 toggles between two coloring modes. In a first state (e.g., checked or selected), a color of the line may be defined by the expression of the event on the selected axis. For example, the hue of the color used to render the line may be proportional to the height at which the line intersects the axis. In a second state (e.g., unchecked or unselected), the hue may be proportional to the sequential number of the line on the selected axis such as when counting from bottom of the axis up. While similar to rendering based on expression, the sequential based color scheme provides a wider variety of colors.

The interface 300 may include a histogram selector 322. The histogram selector 322, when activated, may converts a diagram such as a PCP diagram included on the interface 300 into set of two-dimensional diagrams such as histograms. In some implementations, the set of two-dimensional diagrams may be rotated by 90 degrees on each axis. Other control elements may be included on the interface 300 such as input element 316 to adjust the display properties of the interface 300 or diagram(s) presented therein.

The interface 300 may also include diagrams for visualizing the selected flow cytometry data. The interface 300 shown in FIG. 3 includes an interactive parallel coordinate plot diagram 304, two two-dimensional scatter plot diagrams 306A and 306B, and an interactive cube plot diagram 308A. The interactive parallel coordinate plot diagram 304 displays a set of vertical axes 334 representing a parameter or marker measured in the flow cytometry data. A measurement scale 332 provides a reference for the measurements shown on the vertical axes 334. The measurements may indicate intensity for a given cell or particle for the marker associated with the axis. The interface 300 may include metrics 324 for the displayed data such a total number of cells or particles shown. For example, if the interface 300 is not showing all events/lines, this metrics 324 may include two values: (i) total events count and (ii) displayed events count. As another example, when a subset of events are selected (e.g., gated), the metrics 324 may be updated to display a value indicating the number of selected events.

The vertical axes 334 may be associated with an interactive control (330a through 330h) (collectively or individually referred to as interactive control 330). The interactive control 330 may be a displayable graphic or symbol. In some implementations, the interactive control 330 may be the axis. The interactive control 330 may be activated such as through a click or touch event. When activated, a two-dimensional plot diagram corresponding to the activated axis may be displayed.

In some implementations, a two-dimensional plot diagram may be selectively displayed as a cube plot diagram by selecting a control element such as a cube selector element 320. The cube selector element 320 may activate cube display controls for one or more of the two-dimensional plot diagrams displayed on the interface 300. Once activated, the two-dimensional plot diagram may be referred to as an interactive cube plot diagram. In some implementations, the interface 300 may include one or more interactive control elements to identify two parameters for presenting a two-dimensional plot diagram which can thereafter display a third dimension when activated as a cube plot diagram.

In FIG. 3, the interface 300 includes the interactive cube plot diagram 308A. The interface 300 may include a horizontal cube display control element 350 and a vertical cube display control element 352. The horizontal and vertical cube display control elements (e.g., 350 and 352) are shown as sliders, but may be implemented as other interactive control elements such as dials, text inputs, buttons, or drop down menus to provide a quantity of rotation in the vertical or horizontal direction. In some implementations, areas of the two-dimensional plot diagram may be associated with interactions to cause rotation. For example, the vertical axis may be selected and, once selected, rotated using a gesture. A similar selecting of a vertical axis followed by a gesture may be used to rotate in a horizontal direction.

Figure 4:
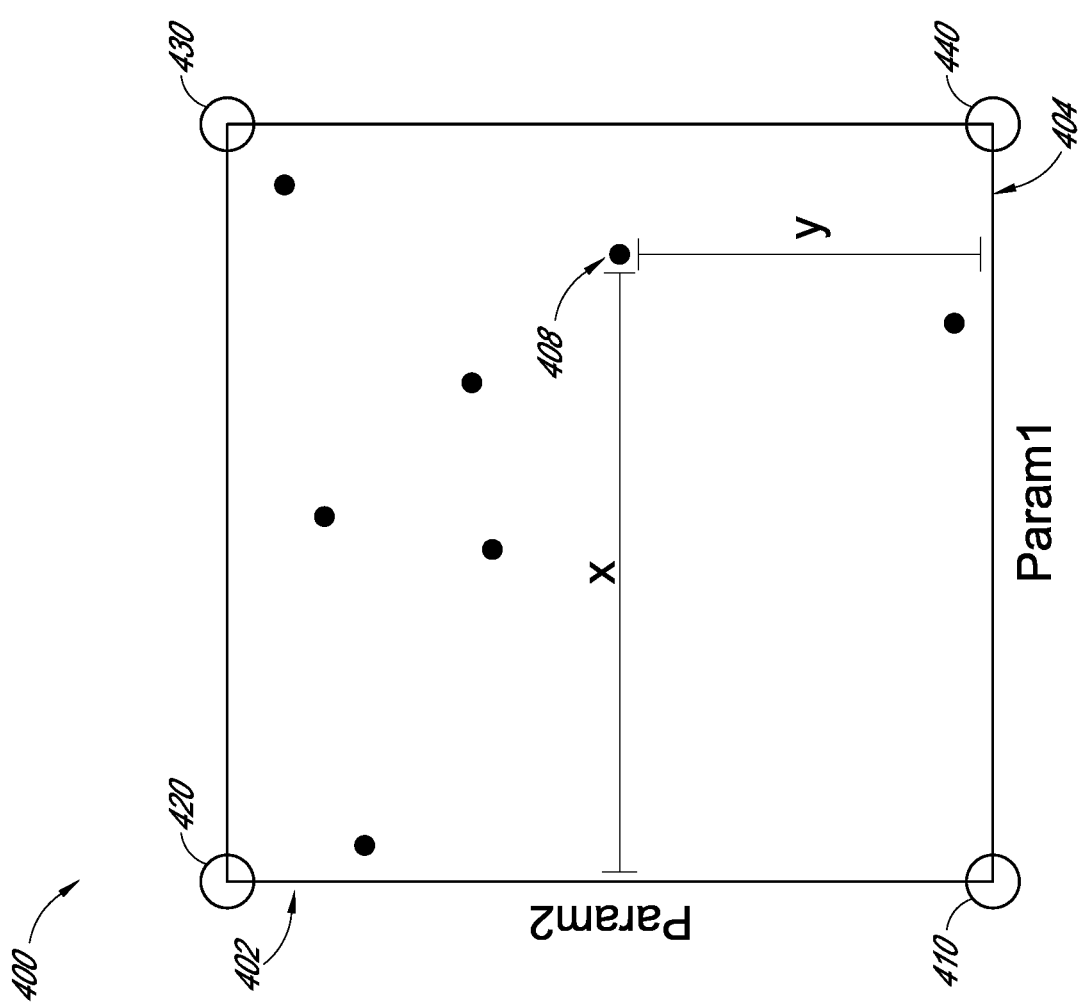
FIG. 4 shows an example of an interactive two-dimensional plot diagram with activated cube controls.

FIG. 4 shows an example of an interactive two-dimensional plot diagram with activated cube controls. The interactive two-dimensional plot diagram 400 includes four cube control elements located at the corners of the interactive two-dimensional plot diagram 400. The interactive cube control elements shown in FIG. 4 are 410, 420, 430, and 440. The cube control elements may be defined by regions covering the corners. The interactive two-dimensional plot diagram 400 includes two parameters (e.g., PCP marker) shown as Param1 and Param2. Graphic indicia may be included in the interactive two-dimensional plot diagram 400 to represent measurements for respective cells or particles. A point 408 is displayed at a distance x from a Y-axis 402 and a distance y above an X-axis 404. The x and y values for the point 408 correspond to the measured values for the respective markers for the cell or particle represented by the point 408.

FIG. 5A shows an example of an interactive cube plot diagram displayed after an interaction with the interactive two-dimensional plot diagram shown in FIG. 4. The diagram 500 shown in FIG. 5A may be the result of interaction with the control element 440. The control element 440 may be selected and rotated to the left. The points representing the cells or particles may now be adjusted to include a third dimension of information for Param3 along a Z-axis 506. As shown, the point 408 remains x distance from the YZ-plane formed from the Y-axis 402 and the Z-axis 506 and y distance above the XZ-plane formed from the X-axis 404 and the Z-axis 506. The point 408 is also shown with a z distance from the frontal XY-plane of the original two-dimensional plot diagram formed from the X-axis 404 and the Y-axis 402. It will be appreciated that other points may be included in the interactive cube plot diagram, but have been omitted from FIG. 5A for clarity of explanation.

The rotation along a horizontal plane may be accompanied by some additional rotation as well to ensure the third dimension can be displayed. The vertical rotation may be dynamically generated based on the horizontal rotation such that when 90 degrees of rotation are complete, a two-dimensional plot diagram is displayed (see, e.g., two-dimensional plot 306a or 306b in FIG. 3). Equation (2) below provides an expression of how vertical rotation amount (y) may be generated dynamically in relation to the amount of horizontal rotation (x).

$$y = 25\left(1 - \left(\frac{x-45}{45}\right)^2\right) \qquad \text{Equation (2)}$$

where: y represents a vertical rotation amount; and
x represents a horizontal rotation amount.

Equation (2) provides a vertical rotation amount between 0 and 25 degrees whereby at the half way horizontal rotation point of 45 degrees, a maximum vertical rotation of 25 degrees is provided. Continued horizontal rotation beyond 45 degrees then decreases the vertical rotation amount, arriving at zero when the horizontal rotation has reached 90 degrees. Similar dynamic assessment may be provided to adjust the display of the horizontal rotation amount based on vertical interaction.

Figure 5B:
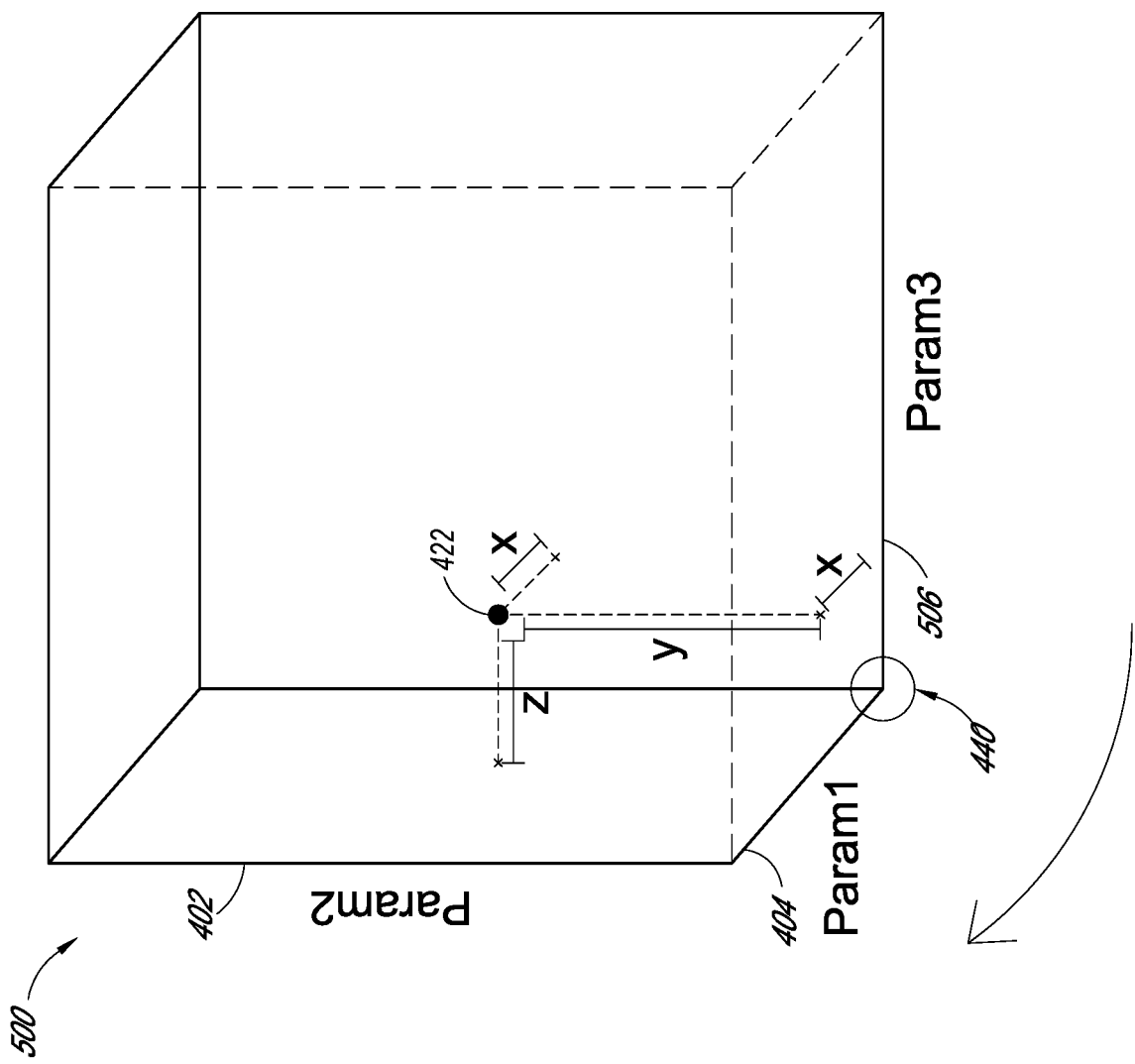
FIG. 5B shows an example of the interactive cube plot diagram displayed after further interaction with the interactive cube plot diagram shown in FIG. 5A.

FIG. 5B shows an example of the interactive cube plot diagram displayed after further interaction with the interactive cube plot diagram shown in FIG. 5A. As shown in FIG. 5B, the cube control element 440 continues clockwise rotation. The x, y, and z distances for the point 422 have been re-oriented to reflect the rotation but the distance amounts remain the same. In FIG. 5B, the Param1 axis 404 is rotating away from view as the Param4 axis 506 is moving into full view.

Figure 6:
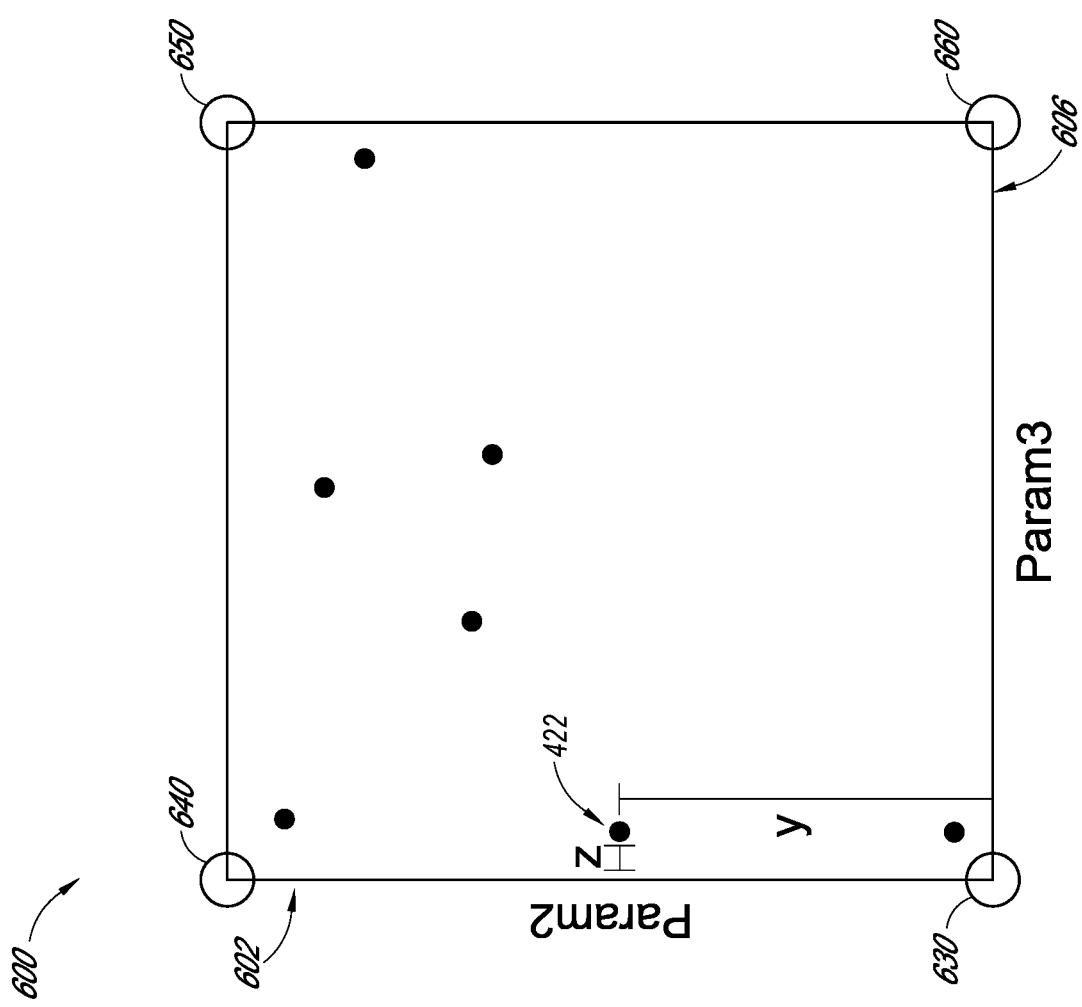
FIG. 6 shows an example of another interactive two-dimensional plot diagram after further interaction with the interactive cube plot diagram shown in FIG. 5B.

FIG. 6 shows an example of another interactive two-dimensional plot diagram after further interaction with the interactive cube plot diagram shown in FIG. 5B. The interactive two-dimensional plot diagram 600 includes an X-axis 606 corresponding to Param3 and a Y-axis 602 corresponding to Param2. The axis showing Param1 is not displayed in FIG. 6 as it has rotated out of view. The point 422 is now rendered in a two dimensional form along with other points included in the data set. The diagram 600 may include interactive control elements (e.g., 630, 640, 650, and 660) similar to the control elements 410, 420, 430, and 440 shown in FIG. 4. The interactive control elements may be used to rotate the diagram 600 again to display a third dimension. If rotated right, an axis showing Param1 may be displayed with Param2 and Param3. If rotated left, if another parameter is included in the data set, a fourth parameter (Param4) may be displayed.

The ordering of parameters that will appear upon rotation may be based on predetermined user preferences. For example, a user may provide an input indicating an order of parameters to display. The order may be identified based on the ordering of vertical axes in a parallel coordinate plot diagram such that a rotation to the right selects the parameter to the right of the parameter associated with the vertical axis of the two-dimensional plot diagram in the parallel coordinate plot diagram. In some implementations, an additional interaction may be detected upon rotation to signal which parameter to add as the third dimension. For example, keys may be mapped to specific parameters and the interaction may be detected along with a key pressed on a keyboard or other input device indicating which parameter to display.

The interactive cube plot diagram allows a user to selectively rotate the diagram to view three dimensions of data in a single diagram. The rotation may also cause selection of a different triad of parameters to display. In this way, the graphics controller may allocate an area for displaying a single diagram that can be manipulated to provide a continuous view of the multi-dimensional data. Using the same allocated area, the interface may be adjusted to display multi-dimensional data rather than allocating new or additional space for each combination to be presented.

Figure 7:
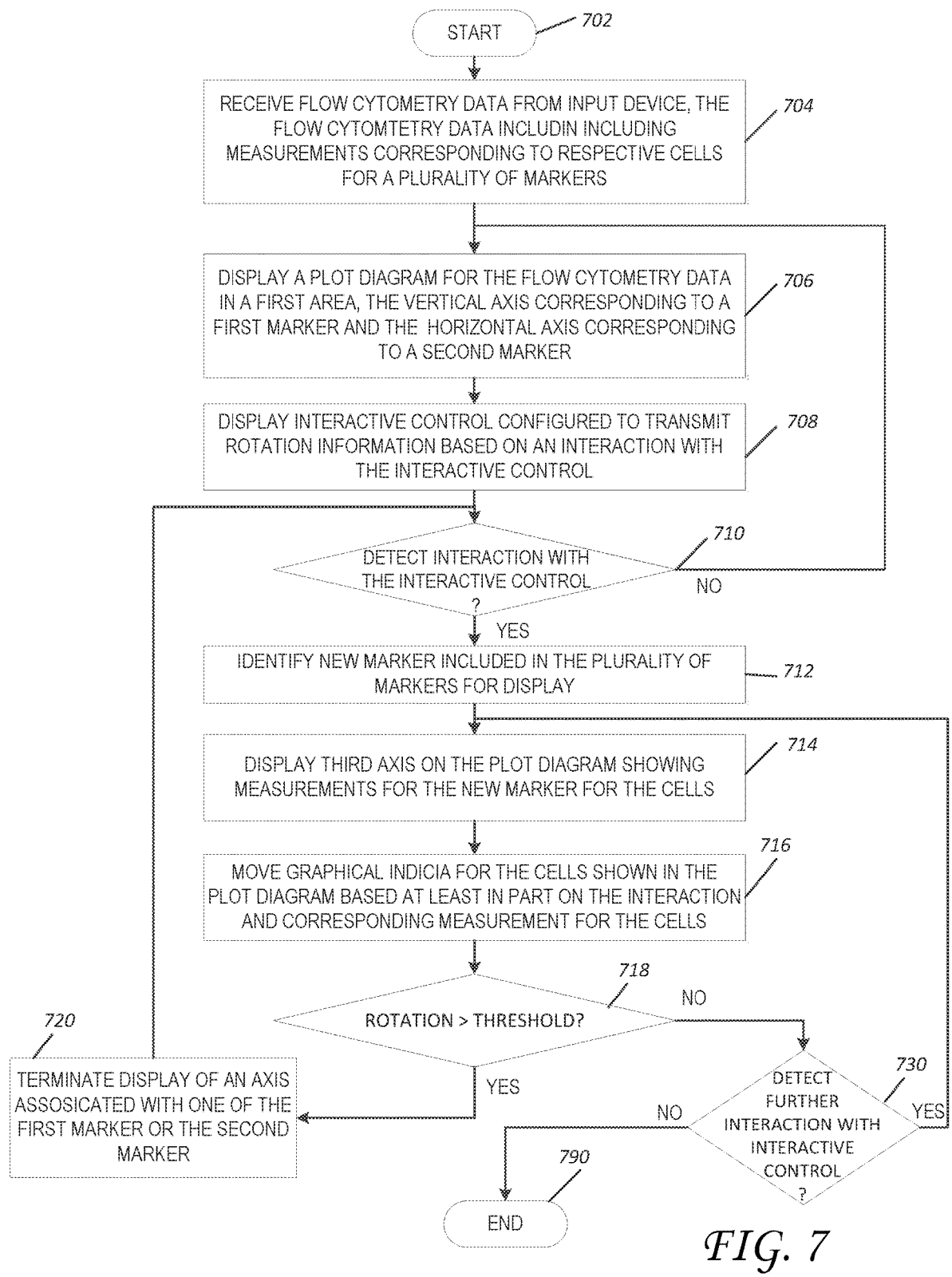
FIG. 7 is a process flow diagram of an example method of displaying a representation of multi-parametric event data for cells on a graphical user interface.

FIG. 7 is a process flow diagram of an example method of displaying a representation of multi-parametric event data for cells on a graphical user interface. The method 700 may be implemented in whole or in part by one or more of the devices described, such as those shown in FIG. 1 or FIG. 2. The method 700 illustrates how a dynamic user interface may be generated and displayed to efficiently represent multi-parameter data and limited the resources needed for the display. The interface may include a representation of multi-parametric event data for cells on a graphical user interface. The event data for a cell may include respective measurements for a set of parameters (e.g., markers). While the description mentions flow cytometry data for the cells, the method 700 may receive and process other measurements collected by a particle analyzer. One example of the interface generated by the method 700 includes the interfaces shown in FIG. 3, FIG. 4, FIG. 5A, FIG. 5B, or FIG. 6.

The method 700 may begin at block 702. At block 704, a graphics controller may receive flow cytometry data from an input device or a flow cytometer. The flow cytometry data may include measurements corresponding to respective cells for a set of markers. Table 1 provides an example of measurements for a small set of cells. It will be appreciated that the flow cytometry data may include hundreds of thousands or millions of cells or particles each with a corresponding set of measurements for each marker in a set of marker. The set of markers may include n elements where n is five, ten, twenty, twenty-five, or more.

TABLE 1

| Cell/Particle No. | Marker 1 measurement | Marker 2 measurement | Marker 3 measurement | ... | Marker n measurement |
|---|---|---|---|---|---|
| 1 | 500 | 326 | 300 | ... | 401 |
| 2 | 479 | 402 | 367 | ... | 393 |
| 3 | 601 | 476 | 413 | ... | 296 |
| ... | ... | ... | ... | ... | ... |

At block 706, the graphics controller may display a plot diagram for the flow cytometry data in a first area on a display device. The plot diagram may include a horizontal axis that corresponds to measurements for a first marker. The plot diagram may include a vertical axis that corresponds to measurements for a second marker. Graphical indicia may be rendered on the plot diagram to indicate an intersection point for measurements of the first and second markers for respective cells or particles.

At block 708, the graphics controller may display an interactive control configured to transmit rotation information based on an interaction with the interactive control. The interactive control may be presented in or proximate to an area used to display the plot diagram. In some implementations, a portion of the plot diagram may comprise the interactive control. For example, as shown in FIG. 5A, an area near a corner of the plot diagram may be associated with an interaction that transmits interaction information to the graphics controller.

At block 710, the graphics controller determines whether an interaction with the interactive control occurs. The detection may be based on receipt of a message identifying a selected interactive control received from an input device such as a mouse, touchscreen, keyboard, or the like. In some implementations, the interaction may be referred to as an event. The graphics controller may queue events as received for processing at an appropriate time such as when sufficient resources (e.g., power, memory, processor load, etc.) are available to the graphics controller. The sufficiency may be identified using predetermined resource threshold whereby a current resource level may be compared to the threshold to determine whether the graphics controller has sufficient resources. In some implementations, the events may be processed as the message is received.

If no interaction is detected, the method 700 may return to block 706 to continue display of the plot diagram. In some implementations, the method 700 may receive additional flow cytometry data such as during real time receipt of measurements from a flow cytometer. In some implementations, additional data may be received based on, for example, receipt of a new file including the measurements for new cells.

Returning to block 710, if an interaction is detected, at block 712 the graphics controller may identify a new marker from the set of markers. The new marker may be identified based on a stored configuration value identifying a sequence for displaying markers. The sequence may be formed from one or more user inputs identifying markers and an order within the sequence. In some implementations, the new marker may be identified based on additional information received with the interaction. For example, keys may be associated with specific markers. The message including the interaction may also include a key press event indicating which key was activated as part of the interaction.

At block 714, the graphics controller may display a third axis on the plot diagram. The third axis may correspond to measurements for the new marker for the cells. The layout of the third axis, and any adjustments to the previously displayed horizontal and vertical axes, may be based in part on the interaction. For example, if the interaction indicated a clockwise rotation of ten degrees the horizontal and vertical axes may be skewed from their original display location by ten degrees. The resulting display may generally appear as a three-dimensional shape such as a cube.

By block 716, the graphics controller may also move the graphical indicia for the cells to provide a graphic representation of the corresponding cells or particles in three rather than two dimensions. The movement direction and quantity may be based at least in part on the interaction and corresponding measurements for the cells.

At block 718, the graphics controller may determine whether the rotation meets a threshold (e.g., 90 degrees). In some instances, rotating the original plot diagram beyond the threshold may cause one of the original axes to terminate display. For example, when looking at a first face of a cube, it may appear as a flat two-dimensional shape. Upon rotation, the third dimension becomes apparent. However, with continued rotation, a second face of the cube may come squarely into view. In such instance, a flat two-dimensional plot diagram is presented. If the determination at block 718 is affirmative, at block 720, the graphics controller may terminate the display of an axis associated with one of the first marker or the second marker. Which axis is removed from the display depends on the direction of rotation. If the rotation is primarily along a horizontal (e.g., left-to-right or right-to-left) direction, the horizontal axis may be removed from the display. If the rotation is along a vertical direction (e.g., top-to-bottom or bottom-to-top), the vertical axis may be removed from display. After terminating display of an axis due to rotation, the method 700 may return to block 710 as described.

Returning to block 718, if the rotation does not exceed the threshold, the method 700 may proceed to block 730. At block 730, the graphics controller may determine whether any further interaction with the interactive control has occurred. If so, the method 700 returns to block 714 as described. If not, the method 700 may end at block 790.

The interface described informs the user in a more convenient and efficient manner than existing systems. Researchers gain a significant advantage by seeing multiple parameters in a single view because they can see the relationships between different markers for a group of cells without switching views and thereby lose contextual display representing important relationships between the measurements displayed. Presenting the parameters as described retains the contextual relationship between the multiple dimensions on a single interface.

When the interface is updated in real time, the progression of an experiment can be observed and used to identify adjustments to the flow cytometer or other particle analyzing device. For example, trends in the measurements for cells of interest, the function of the flow cytometer, or other relevant characteristics are more easily identifiable by the user through the use of the present invention. Furthermore, the interface described provides a concise and efficient representation of large sets of multi-parameter data such as those associated with a flow cytometry experiment or single-cell gene expression experiment.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields, buttons, or other interactive controls for receiving input signals or providing electronic information or for providing information to the user in response to any received input signals. A UI may be implemented in whole or in part using technologies such as hyper-text mark-up language (HTML), JAVASCRIPT™, FLASH™, JAVA™, .NET™, WINDOWS OS™, macOS™, web services, or rich site summary (RSS). In some implementations, a UI may be included in a stand-alone client (for example, thick client, fat client) configured to communicate (e.g., send or receive data) in accordance with one or more of the aspects described.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein, a phrase referring to "at least one of" a list of items refers to any combination of those items, including single members. As an example, "at least one of: a, b, or c" is intended to cover: a, b, c, a-b, a-c, b-c, and a-b-c.

Those of skill in the art would further appreciate that the various illustrative logical blocks, modules, circuits, and algorithm steps described in connection with the embodiments disclosed herein may be implemented as specially configured electronic hardware, computer software, or combinations of both. To clearly illustrate this interchangeability of hardware and software, certain illustrative components, blocks, modules, circuits, and steps may be described in terms of their functionality. Whether such functionality is implemented as hardware or software depends, at least in part, upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as specifically programmed event processing computers, wireless communication devices, flow cytometers, particle analyzers, or integrated circuit devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable medium may be a non-transitory storage medium. The techniques additionally, or alternatively, may be realized at least in part by a computer-readable communication medium that carries or communicates program code in the form of instructions or data structures and that can be accessed, read, and/or executed by a computing device, such as propagated signals or waves.

The program code may be executed by a specifically programmed graphics processor, which may include one or more processors, such as one or more digital signal processors (DSPs), configurable microprocessors, an application specific integrated circuits (ASICs), field programmable logic arrays (FPGAs), or other equivalent integrated or discrete logic circuitry. Such a graphics processor may be specially configured to perform any of the techniques described in this disclosure. A combination of computing devices, e.g., a combination of a DSP and a microprocessor, a plurality of microprocessors, one or more microprocessors in conjunction with a DSP core, or any other such configuration in at least partial data connectivity may implement one or more of the features describe. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding messages, or incorporated in a specialized graphic control card.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Various embodiments of the invention have been described. These and other embodiments are within the scope of the following claims.

What is claimed is:

1. A computer-implemented method for displaying a representation of multi-parametric data for cells on a graphical user interface, wherein the multi-parametric data for a cell includes respective measurements for a plurality of parameters comprising at least four parameters, wherein the parameters measured comprise one or more of excitation light that is scattered by the cell along a mostly forward direction, excitation light that is scattered by the cell along a mostly sideways direction or light emitted from fluorescent molecules or fluorescent dyes used to label the cell in one or more ranges of frequencies, the computer-implemented method comprising:

under control of one or more processors,
(1) dynamically displaying, via a display device, a plot diagram in exclusively two-dimensions, the plot diagram including:
(i) a vertical axis corresponding to a first parameter of the plurality of parameters;
(ii) a horizontal axis corresponding to a second parameter of the plurality of parameters;
(iii) a graphical indicia for a cell at an intersection point for a first measurement for the first parameter for the cell and a second measurement for the second parameter for the cell; and
(iv) an interactive control configured to transmit rotation information based on an interaction therewith, wherein the rotation information identifies a rotation axis and a rotation quantity;
(2) receiving, via the display device, a selection of a third parameter included in the plurality of parameters;
(3) receiving, from the interactive control, the rotation information, and
(4) in response to receiving the rotation information:
dynamically introducing a third axis on the plot diagram based at least in part on the rotation information, wherein the third axis corresponds to the third parameter newly rendered in a third dimension and the third axis is newly added to the plot diagram after receiving the rotation information; and
moving the graphical indicia for the cell to a three dimensional intersection point comprising: (i) the first measurement for the first parameter for the cell, (ii) the second measurement for the second parameter for the cell, and (iii) a third measurement for the third parameter for the cell.

2. The computer-implemented method of claim 1, further comprising:
(5) receiving additional rotation information from the interactive control, wherein the rotation quantity exceeds a rotation threshold; and
(6) terminating the display of the first axis on the plot diagram, wherein, upon said terminating, the plot diagram includes exclusively two-dimensions, wherein a first dimension of the two-dimensions corresponds to the second parameter and a second dimension of the two-dimensions corresponds to the third parameter.

3. The computer-implemented method of claim 2, wherein steps (2)-(6) are repeated so that a display of each parameter of the plurality of parameters is introduced on a newly added third axis to the plot diagram and is subsequently terminated such that the resulting plot diagram comprises exclusively two axis.

4. The computer-implemented method of claim 1, wherein receiving the selection of the third parameter comprises:
receiving a user input identifying the third parameter;
storing, in a memory, the third parameter in association with an identifier for the user;
receiving, via the display device, the identifier for the user; and
retrieving, from the memory, the third parameter based at least in part on the identifier.

5. The computer-implemented method of claim 1, wherein the plot diagram in two-dimensions comprises a scatter plot diagram.

6. The computer-implemented method of claim 1, wherein the interactive control comprises a first region bounding the vertical axis, and wherein the computer implemented method further comprises:
receiving selection information identifying selection of a first point in the first region;
receiving deselection information identifying a second point where the selection was terminated;
generating the rotation quantity based on a distance between the first point and the second point; and
generating a rotation angle based on an angle between the first point and the second point.

7. The computer-implemented method of claim 1, wherein the cell is taken from a sample, and wherein the computer-implemented method further comprises:
receiving measurements, from a particle analyzer, for a second cell from the sample; and
wherein dynamically displaying the plot diagram in two dimensions comprises including a second graphical indicia for the second cell at a second intersection point for a third measurement for the first parameter for the second cell and a fourth measurement for the second parameter for the second cell.

8. A graphics control system for displaying a representation of multi-parametric data for biological particles on a graphical user interface, wherein the multi-parametric data for a biological particle includes respective measurements for a plurality of parameters comprising at least four parameters, wherein the parameters measured comprise one or more of excitation light that is scattered by the biological particle along a mostly forward direction, excitation light that is scattered by the biological particle along a mostly sideways direction or light emitted from fluorescent molecules or fluorescent dyes used to label the biological particle in one or more ranges of frequencies, the system comprising:
plot generating circuitry configured to:
dynamically display, via a display device, a plot diagram in exclusively two-dimensions, the plot diagram including:
(i) a vertical axis corresponding to a first parameter of the plurality of parameters;
(ii) a horizontal axis corresponding to a second parameter of the plurality of parameters;
(iii) a graphical indicia for a biological particle at an intersection point for a first measurement for the first parameter for the biological particle and a second measurement for the second parameter for the biological particle; and (iv) an interactive control configured to transmit rotation information based on an interaction therewith, wherein the rotation information identifies a rotation axis and a rotation quantity;

an input device port configured to:

receive, via the display device, a selection of a third parameter included in the plurality of parameters, and receive, from the interactive control, the rotation information; and wherein in response to receiving the rotation information, the plot generating circuitry is further configured to:

dynamically introduce a third axis on the plot diagram based at least in part on the rotation information, wherein the third axis corresponds to the third parameter newly rendered in a third dimension and the third axis is newly added to the plot diagram after receiving the rotation information, and move the graphical indicia for the biological particle to a three-dimensional intersection point comprising: (i) the first measurement for the first parameter for the biological particle, (ii) the second measurement for the second parameter for the biological particle and (iii) a third measurement for the third parameter for the biological particle.

9. The graphics control system of claim 8, wherein the input device port is further configured to receive additional rotation information from the interactive control, wherein the rotation quantity exceeds a rotation threshold; and wherein the plot generating circuitry is further configured to terminate the display of the first axis on the plot diagram, and wherein, upon said terminating, the plot diagram includes exclusively two-dimensions, wherein a first dimension of the two dimensions corresponds to the second parameter and a second dimension of the two-dimensions corresponds to the third parameter.

10. The graphics control system of claim 9, wherein the input device port and the plot generating circuitry are further configured so that a display of each parameter of the plurality of parameters may be introduced on a newly added third axis to the plot diagram and is subsequently terminated such that the resulting plot diagram comprises exclusively two axis.

11. The graphics control system of claim 8, further comprising a memory storing the third parameter in association with an identifier for the user, wherein the input device port is further configured to receive, via the display device, the identifier for the user, and wherein the plot generating circuitry is further configured to retrieve, from the memory, the third parameter based at least in part on the identifier.

12. The graphics control system of claim 8, wherein the plot diagram in two-dimensions comprises a scatter plot diagram.

13. The graphics control system of claim 8, wherein the interactive control comprises a first region bounding the vertical axis, and wherein the input device port is further configured to:

receive selection information identifying selection of a first point in the first region, and receive deselection information identifying a second point where the selection was terminated; and wherein the plot generating circuitry is further configured to:

generate the rotation quantity based on a distance between the first point and the second point, and generate a rotation angle based on an angle between the first point and the second point.

14. The graphics control system of claim 8, wherein the biological particle is taken from a sample, the graphics control system further comprising a particle analyzer input port configured to receive measurements, from a particle analyzer, for a second biological particle from the sample; and wherein the plot generating circuitry is configured to dynamically display the plot diagram in two-dimensions by including a second graphical indicia for the second biological particle at a second intersection point for a third measurement for the first parameter for the second biological particle and a fourth measurement for the second parameter for the second biological particle.

15. A system for displaying a representation of multi-parametric data for particles on a graphical user interface, the system comprising:

a particle analyzer configured to detect, for each of the particles, measurements for respective markers, comprising at least four markers, wherein the markers measured comprise one or more of excitation light that is scattered by the particle along a mostly forward direction, excitation light that is scattered by the particle along a mostly sideways direction or light emitted from fluorescent molecules or fluorescent dyes used to label the particle in one or more ranges of frequencies; and graphics processing circuitry in communication with the particle analyzer, the graphics processing circuitry configured to:

(1) dynamically display, via a display device, a plot diagram in exclusively two-dimensions, the plot diagram including:

(i) a vertical axis corresponding to a first marker included in the markers;

(ii) a horizontal axis corresponding to a second marker included in the markers;

(iii) a graphical indicia for a particle at an intersection point for a first measurement for the first marker for the particle and a second measurement for the second marker for the particle; and (iv) an interactive control configured to transmit rotation information based on an interaction therewith, wherein the rotation information identifies a rotation angle and a rotation quantity;

(2) receive, via the display device, a selection of a third marker included in the markers;

(3) receive, from the interactive control, the rotation information; and (4) in response to receiving the rotation information:

dynamically introduce a third axis on the plot diagram based at least in part on the rotation information, wherein the third axis corresponds to the third marker newly rendered in a third dimension and the third axis is newly added to the plot diagram after receiving the rotation information; and move the graphical indicia for the particle to a three-dimensional intersection point comprising: (i) the first measurement for the first marker for the particle, (ii) the second measurement for the second marker for the particle, and (iii) a third measurement for the third marker for the particle.

16. The system for displaying a representation of multi-parametric data for particles on a graphical user interface of claim 15, wherein the graphics processing circuitry is configured to:

(5) receive additional rotation information from the interactive control, wherein the rotation quantity exceeds a rotation threshold; and (6) terminate the display of the first axis on the plot diagram, wherein, upon said termination, the plot diagram includes exclusively two-dimensions, wherein a first dimension of the two-dimensions corresponds to the second parameter and a second dimension of the two-dimensions corresponds to the third parameter.

17. The system for displaying a representation of multi-parametric data for particles on a graphical user interface of claim 16, wherein steps (2)-(6) are repeated so that a display of each parameter of the plurality of parameters is introduced on a newly added third axis to the plot diagram and is subsequently terminated such that the resulting plot diagram comprises exclusively two axis.

* * * * *